Nov. 3, 1964  G. BUCHIK ETAL  3,155,416
AUTOMATIC LEVELING DEVICE FOR TONGS
Filed Aug. 7, 1962  3 Sheets-Sheet 1

INVENTORS:
GEORGE BUCHIK
CHEN-NUO YU
BY
ATT'Y

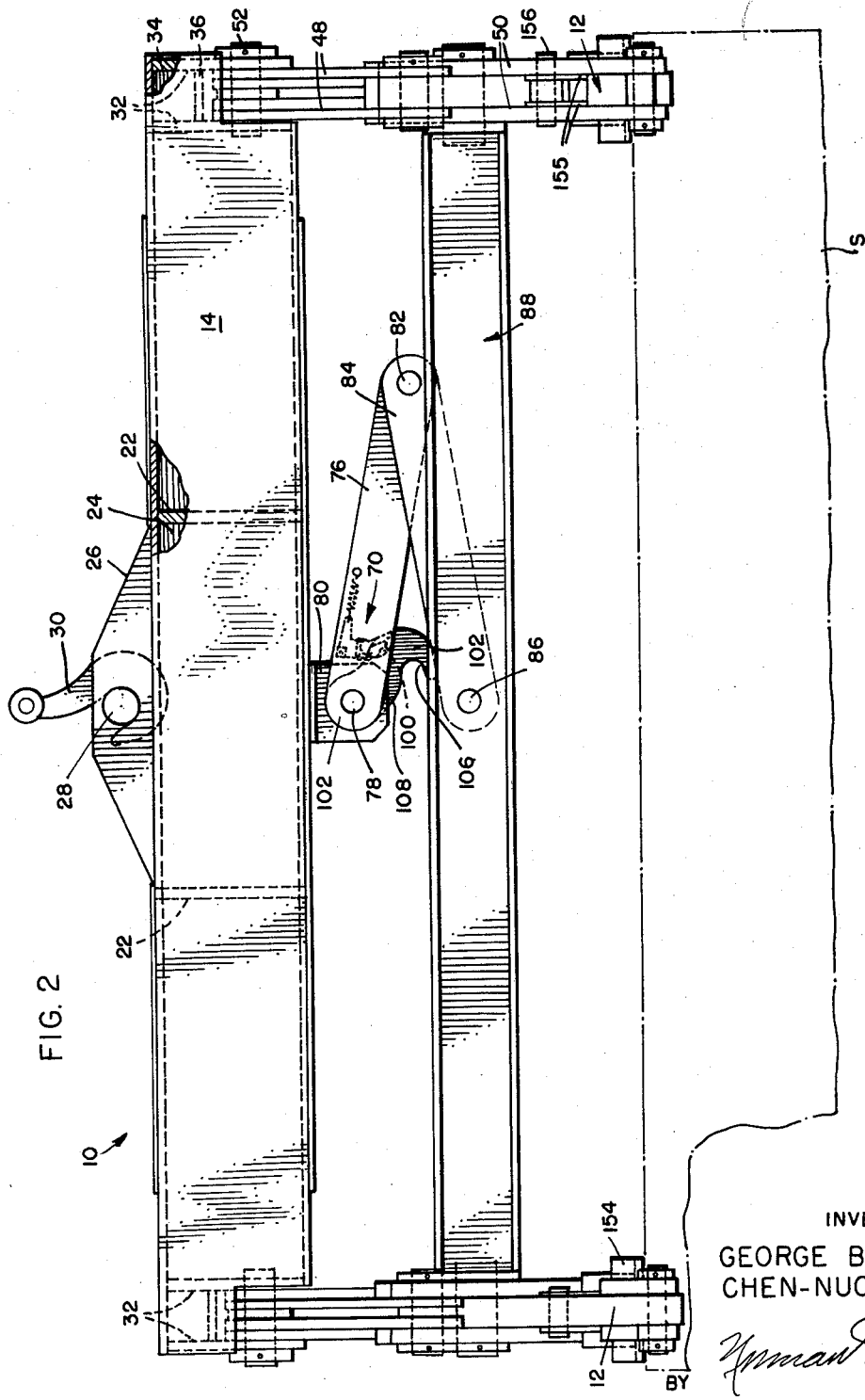

Nov. 3, 1964  G. BUCHIK ETAL  3,155,416
AUTOMATIC LEVELING DEVICE FOR TONGS
Filed Aug. 7, 1962  3 Sheets-Sheet 3
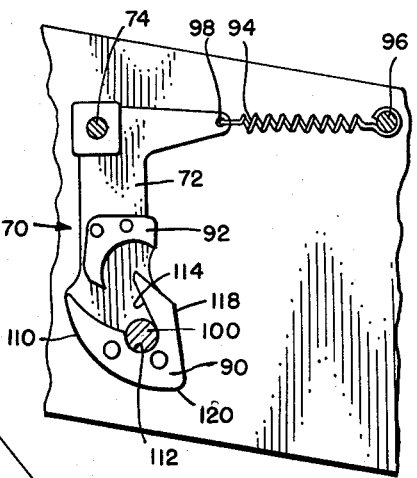
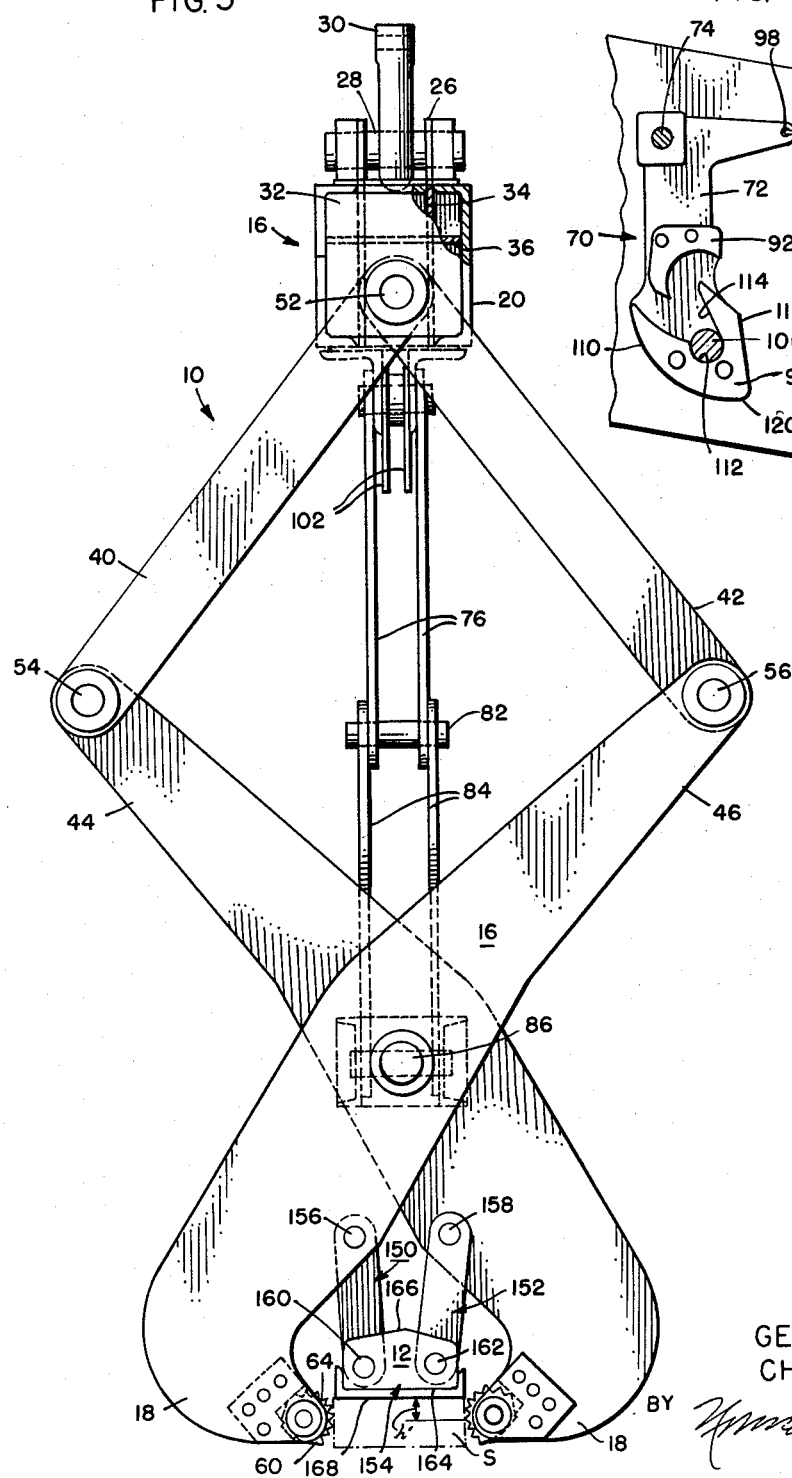
INVENTORS:
GEORGE BUCHIK
CHEN-NUO YU
BY
ATT'Y

United States Patent Office 3,155,416
Patented Nov. 3, 1964

3,155,416
AUTOMATIC LEVELING DEVICE FOR TONGS
George Buchik, Elmhurst, and Chen-Nuo Yu, Chicago, Ill., assignors to Cullen-Friestedt Company, Chicago, Ill., a corporation of Delaware
Filed Aug. 7, 1962, Ser. No. 215,432
2 Claims. (Cl. 294—81)

The present invention relates generally to lifting mechanism and has particular reference to an automatic leveling device for lifting tongs, the device serving, in connection with normal use or operation of the tongs, to establish a predetermined level on the opposite sides of an article where the jaws of the tongs take effect, this level being related to a surface on the article and remaining constant for articles which differ in width.

The improved leveling device comprising the present invention has been designed for use primarily in connection with tongs of the link and lever type, that is, tongs which are designed primarily for use in connection with the lifting and transporting of heavy objects such as slabs, billets, stacks of sheet metal, steel mill ingot molds and other articles having flat or uniformly shaped upper surfaces.

Tongs of the aforementioned type are disclosed in United States Patent No. 1,839,389 and will serve as a basis for illustrating the advantages of the present invention. When tongs of the character under consideration are raised by means of an overhead hoist, the central pivots will separate vertically to close the jaws of the tongs upon an article or object to be lifted, for example, upon a rectangular slab. Such closing of the jaws is made possible by reason of previous releasing of a latch mechanism in connection with resting of the tongs, immediately prior to raising thereof, upon the slab to be lifted. After the jaws of the tongs have been closed upon the slab and the latter transported to the overhead hoist to a desired location, lowering of the tongs will bring the jaws to their fully open position due to the seating of the tongs upon the slab. This seating of the tongs also operates the latch mechanism to latch the tongs in full open position so that the next raising thereof will lift the tongs from the slab and maintain the jaws in their wide open position. The next time the tongs are lowered upon a slab preparatory to lifting of the latter, the latch mechanism again becomes released and the lifting operation is repeated. The latch mechanism thus functions alternately to become latched and unlatched and the lifting operation can take place only after every other resting of the tongs upon a solid object.

Tongs of the character briefly outlined above are possessed of one serious limitation, namely, that after lowering upon a slab or other object while the jaws are in wide open position, the depth at which the slab will be engaged when the jaws close upon the slab is a function of slab width. A slab which is nearly as wide as the maximum width of jaw spread will be engaged near the upper region of the slab, while a narrower slab will be engaged further down along the opposite sides of the slab. It is possible that, when lifting an extremely thin article, the jaws of the tongs will engage the article at a level below the center of gravity of the article, thus causing the article to tilt and invert itself between the jaws, this obviously being hazardous due to possible dropping of the article, and being disadvantageous in that, before the article is deposited at the remote location, it must be righted to the position it will assume when deposited.

The present invention is designed to overcome the above-noted limitation that is attendant upon the construction and use of conventional link and lever type tongs and, toward this end, the invention contemplates the provision of a novel leveling device which, when applied to a link and lever type tongs, establishes a predetermined level which is below the upper flat horizontal face of a slab or similar article to be lifted and at which jaws of the tongs will upon closing engage the article for lifting purposes, the level remaining the same regardless of the width or height of the article. By such an arrangement, the device, when properly designed to accomplish its intended purpose, may be constructed to effect jaw-engagement of a wide variety of articles with the jaws moving into contact with the opposite sides of each individual article at a distance which is, for example, one inch below the upper horizontal face of the article, this distance being considered a safe distance where there is sufficient metal backing for the points of engagement by the jaws that the article will not slip from the jaws due to metal failure along the upper edges or side portions of the article.

The provision of a leveling device of this type being among the principal and general objects of the invention, it is a further object to provide a leveling device which is designed primarily for use with link and lever type tongs and consists of but three principal parts, thus contributing toward economy of manufacture. A similar and related object is to provide a leveling device which is rugged and durable and, therefore, is unlikely to get out of order.

Numerous other objects and advantages of the invention, not at this time enumerated, will become readily apparent as the following description ensues.

In the accompanying three sheets of drawings forming a part of this specification, tongs of the dual jaw type and embodying two of the novel leveling devices of the present invention have been illustrated.

In these drawings:

FIG. 2 is an end elevational view of the tongs shown in FIG. 1;

FIG. 3 is a front elevational view similar to FIG. 1 but showing the tongs in operative engagement and supporting relationship with a relatively narrow slab; and FIG. 4 is a detail elevational view of a latch mechanism employed in connection with the invention.

Figure 1:
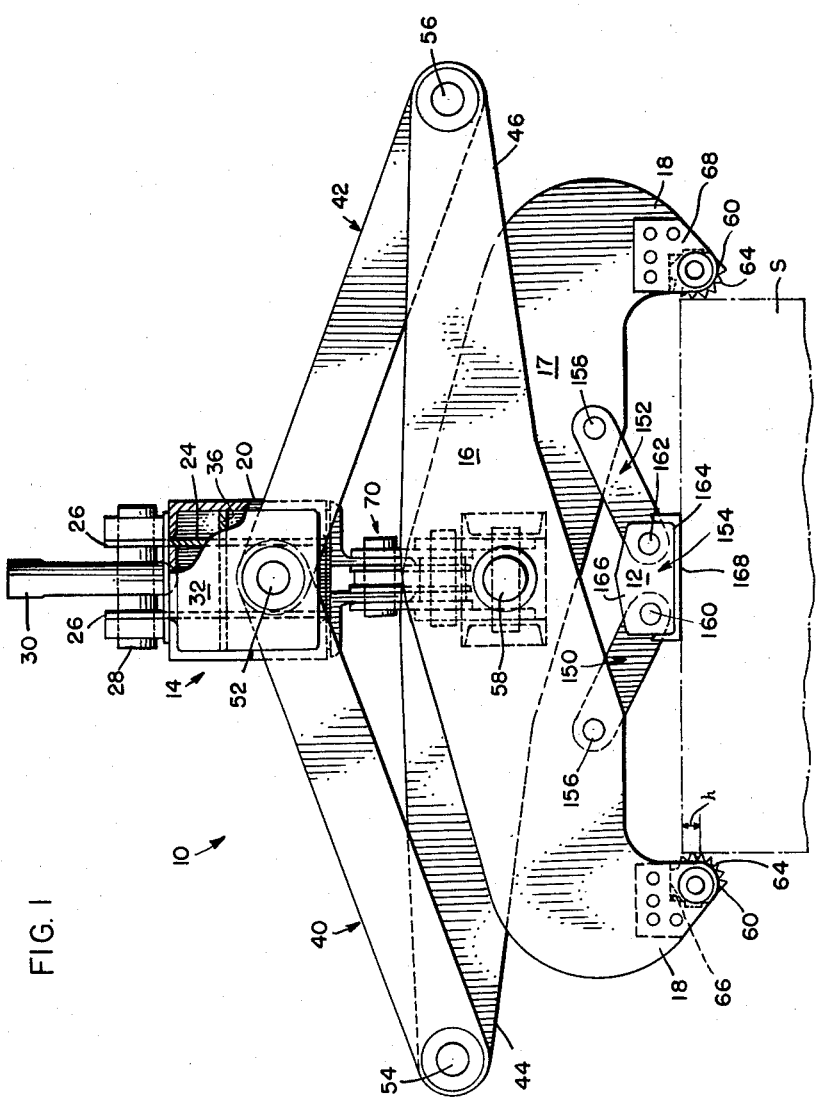
FIG. 1 is a front elevational view of link and lever type tongs which are suitable for use in steel mill operations and have the improved leveling devices applied thereto showing the tongs in operative engagement and supporting relationship with a relatively wide slab.

Referring now to the drawings in detail and in particular to FIGS. 1 and 2, tongs of the link and lever and dual-jaw type and suitable for use in handling heavy objects, such as steel mill ingot molds, slabs, billets, stacks of sheet metal and the like have been designated in their entirety by the reference numeral 10 and they are shown as having applied thereto two of the leveling devices of the present invention, each device being designated in its entirety by the reference numeral 12. The tongs 10, exclusive of the leveling devices 12, are of more or less conventional construction and involve in their general organization a lifter head beam 14 to which there is pivoted the upper ends of two identical link and lever assemblies 16 and 17, the lower ends of which carry the jaws 18 of the tongs.

The head beam 14 is comprised of an elongated open-ended tubular box-like structure 20 across the opposing sides of which there extend, in the medial regions of the structure, transverse vertical plates 22, and longitudinal vertical plates 24, the various plates being welded in position on the tubular structure. The longitudinal vertical plates 24 project upwardly above the tubular structure as indicated at 26 and a bail or suspension pin 28 extends across these upward extensions of the plates 22, the pin 28 being designed for cooperation with the suspension hook 30 of an overhead hoist (not shown).

Near each end of the tubular structure 20, spaced vertical transverse plates 32, vertical longitudinal plates 34 and longitudinal horizontal plates 36 afford a comparatively strong structure for suspension therefrom of one of the two link and lever assemblies 16 and 17.

The two link and lever assemblies 16 and 17 are substantially identical in design and construction and, therefore, a description of one of them will suffice for the other. The assembly 16, as viewed in FIG. 1, includes a pair of composite links in the form of a left-hand link 40 and a right-hand link 42, and also includes a pair of composite levers in the form of a lever 44 in pivotally connected relation with the link 40 and a lever 46 in pivotally connected relation with the link 42. The links and levers are of a composite nature in that they are comprised of parallel link and lever sections 48 and 50 (see FIG. 2) as is customary in the construction of tongs for heavy duty use.

The upper ends of the links 40 and 42 are pivotally connected to the head beam 14 by a pin 52 which is common to both links and is supported between the plates 32. The two links 40 and 42 are divergent and the lower free ends thereof are pivotally connected by means of pins 54 and 56, respectively, to the upper ends of the levers 44 and 46, while the medial regions of the two levers are connected together by a pin 58. The two levers 44 and 46 are generally of L-shape design as is customary in connection with heavy duty lifting tongs. The previously mentioned jaws 18 are located at the base regions of the assemblies 16 and 17 and are reinforced and rendered more efficient for work-engaging purposes by means of hardened steel inserts 60. The latter have serrated edge regions 64 and they afford series of sharp edges which have gripping and anti-slip characteristics when in engagement with the article to be lifted. The inserts 60 are held in place within recesses 66 in the jaws by means of riveted plates 68.

The tongs 10 further include an automatic latch mechanism which is designated in its entirety by the reference numeral 70 and serves to latch and thus maintain the tongs in a fully open condition with the jaws 18 thereof in their position of maximum opening when the tongs are raised from a slab or other article which has just been deposited by the tongs upon a supporting surface. The latch mechanism 70 also serves or functions to release the tongs from their latched condition when the tongs are lowered upon an article about to be lifted from the supporting surface for transportation to a remote location. Such a latch mechanism has been shown and described in a copending United States patent application Serial No. 93,390, filed on March 6, 1961, and entitled "Coil Grab." The latch mechanism 70 which is disclosed herein is related to the leveling devices 12 of the present invention only insofar as the latter constitutes an effective means for "triggering" the latch mechanism and, therefore, it is deemed necessary to describe the latch mechanism at least to the extent necessary to an understanding of this triggering function. For a more detailed description of the latch mechanism, reference may be had to the aforementioned patent application.

Briefly, and as best shown in FIGS. 2 and 4, the latch mechanism 70 comprises a spring-biased floating latch plate 72 which is pivoted as at 74 to a first link 76. The latter, in turn, is pivoted as at 78 to a depending ear 80 on the head 14. The distal end of the link 76 is pivoted as at 82 to a second link 84 which has its proximal end pivoted as at 86 to a cross-frame 88. The latter extends between the two link and lever assemblies 16 and 17 at the regions of pivotal connection between the links 40 and 42 and their respective levers 44 and 46. The two links 76 and 84 thus have a scissors effect during jaw-opening and jaw-closing movements. The latch plate 72 is provided with a latch seat 90 and an overlying latch guide shoulder 92. A spring 94 has one end attached as at 96 to the link 76, has its other end attached as at 98 to the latch plate 72, and serves to bias the floating latch member to a mid-position of equilibrium. The floating latch plate 72 is designed for cooperation with a latch pin 100 on a hook plate 102 which is pivotally supported from a suspension pin 104. The lower end of the hook plate is provided with a hook portion 106 for cooperation with the pin 86 by means of which the link 84 is pivoted to the cross-frame 88.

In the operation of the tongs, assuming that the hook portion 106 of the hook plate 102 is beneath the pin 86 so that the tongs are collapsed and the jaws 18 are in their wide-open position, the tongs will be centered by the overhead hoist operator above an object, such as the slab S (fragmentarily shown in FIGS. 1 and 2), while the slab is resting upon a suitable surface. Lowering of the tongs will place the entire weight of the tongs upon the slab, the latter engaging the leveling devices 12 in a manner that will be made clear presently. As a consequence, the hook plate 102 will move downwardly and release the pin 86 while, at the same time, a surface 108 thereon will slide on the pin and cause the hook plate to be swung to the right, as viewed in FIG. 2, thus causing the latch pin 100 to engage a surface 110 on the latch seat 90 so that the latch plate 72 is constrained to swing in a counterclockwise direction, as viewed in the drawings. As soon as the latch pin 100 clears the surface 110 of the seat 90, it will release the latch plate 72 and allow the latter to move a short distance in a clockwise direction, bringing the latch pin 100 into vertical register with a depression 112 in the latch seat. As the overhead hoist raises the head 14, the latch pin 100 moves downward into the depression 112 and the latch plate is thus latched in an out-of-the-way position so that normal action of the tongs will take place under the influence of the gravitational weight of the link and lever assemblies 16 and 17. The jaws 18 will thus close upon the slab S in the usual manner of operation of the tongs. They will grip the sides of the slab and retain the slab suspended until such time as the operator of the hoist again lowers the tongs so that the slab again seats or rests upon the supporting surface. When the suspended slab engages the supporting surface, continued lowering of the tongs will cause the scissors-like links 76 and 84 to close upon each other and the hook plate 102 will again engage the pin 86 and swing in a counterclockwise direction to cause the latch pin 100 to ride upwardly on a surface 114 and onto the surface 116 of the latch guide shoulder 92 where it will remain until such time as the slab has been released and the empty tongs again elevated. During elevation of the tongs, the latch pin 100 will ride downwardly on the surface 118 of the latch seat 90 until it clears the bottom end 120 of the seat, whereupon the spring 94 will restore the latch plate to its normal floating position of equilibrium and the hook portion 106 of the hook plate 102 will again underlie the pin 52.

As previously stated, the two leveling devices 12 of the present invention serve the dual purpose of (1) establishing below the upper horizontal surface of an article, such as the slab S, a predetermined level at which the serrated edge regions 64 of the jaws 18 will engage the slab when lifting operations on the slab are first initiated, and (2) constituting, in effect, a trigger for initiating the releasing action of the automatic latch mechanism 70.

The two leveling devices 12 are identical and each device is comprised of three principal parts, namely, two composite thrust links 150 and 152, and a combined latch trigger and seating foot 154. Such latch trigger and seating foot will be referred to hereafter simply as a foot. The composite thrust links 150 and 152 are each comprised of parallel link sections 155 (see FIG. 2). The upper end of the composite thrust link 150 is pivoted by a cross pin 156 to the lever 46, while the upper end of the composite thrust link 152 is pivoted by a cross pin 158 to the lever 48. The lower end of the composite thrust link 150 is pivoted by a pin 160 to the foot 154, while the lower end of the composite thrust link 152 is similarly pivoted by a pin 162 to the foot 154. The foot 154 is comprised of a short length 164 of channel stock. To such length there is welded a pair of end plates 166 for supporting the pins 160 and 162. The effective lengths of the two composite thrust links 150 and 152 are equal so that the underneath face 168 of the channel length 164 extends horizontally and constitutes a seat proper which is adapted to come to rest squarely upon the upper horizontal surface of the slab S when the tongs are lowered upon such surface.

It is to be particularly noted at this point that the points of pivotal connection which are represented by the cross pins 156 and 158 are located on the levers 40 and 42, respectively, at regions which are substantially equally spaced from the pivot pins 160 and 162 and the effective work-engaging regions of the hardened steel inserts 60 of the jaws 18. It is also to be noted that the effective lengths of the composite links 150 and 152 are such that the horizontal plane of the underneath face 168 of the channel length 164 lies a slight distance above the effective horizontal plane of jaw-engagement with the vertical sides of a slab to be lifted. This condition obtains in any position of the link and lever assemblies of the tongs and the specific distance or vertical height between the plane of the underneath face 168 of the channel length 164 and the plane of engagement is a function of the effective lengths of the links 150 and 152. This vertical distance may be varied by varying the effective lengths of the links 150 and 152, it being understood that the longer the links are the smaller will be this distance.

In FIG. 1, the tongs 10 are shown in a position wherein the jaws 18 are closed upon the relatively wide slab S, the latter having a width only slightly less than the permissible maximum jaw spread. Because the opposed pairs of jaws are widely separated with the levers 44 and 46 extending in a generally horizontal direction and at a small angle to each other, the cross pins 156 and 158 are likewise spaced apart comparatively widely so that the composite thrust links 150 and 152 make a small angle with respect to each other. The foot 154 of each leveling device is thus suspended from the links at a relatively high elevation with respect to the jaws as a whole, and the vertical distance between the plane of the underneath face 168 and the plane of jaw-engagement is represented by the dimension $h$ in FIG. 1. This dimension conveniently may be a distance of one inch in actual practice since, in connection with slabs, billets and similar articles, jaw-engagement with the vertical sides of the article at a distance which is one inch below the upper edges of the article results in a safe engagement with adequate metal backing or reinforcement for the points of jaw-engagement so that there will be no failure of the metal of the article and consequent slippage of the article from between the opposed jaws 18.

In FIG. 3, the tongs 10 are shown with the lever and link assemblies 16 and 17 assuring positions wherein the jaws 18 are closed upon a relatively narrow slab S', the latter having a width only slightly greater than the permissible minimum jaw spread. It is to be observed in connection with this disclosure that the opposed jaws 18 are relatively close to each other so that the levers against assume a small angle to each other but extend generally vertically instead of horizontally. The cross pins 156 and 158 are thus relatively close together and, as a consequence, the composite thrust links 150 and 152 of the leveling devices 12 extend generally vertically and in parallelism so that the foot 154 of each device is removed an appreciable distance from the pivot pin 86. Despite such rearrangement of the link and lever assemblies of the tongs and of the leveling devices 12, the plane of the underneath face 168 of the channel length 164 remains spaced above the horizontal plane of jaw-engagement by a distance which is represented at $h'$ in FIG. 3 and is equal to the distance $h$ represented in FIG. 1 where the tongs are shown as lifting the relatively wide slab S.

From the above description, it will be apparent that, regardless of the effective width of an article which is operatively engaged by the jaws 18 of the tongs 10, the jaws will initially contact the opposite sides of the article at regions which are spaced a predetermined distance below the upper edges of the article, this being the principal function of the leveling devices 12. The devices, however, have a second and important function in that, when the tongs are lowered upon a slab or similar article, as soon as the seating foot 154 of each device 12 engages the upper horizontal surface of the article, the composite thrust links 150 and 152 are placed under compression so that an upward and outward thrust is applied to the levers 44 and 46, thus releasing the automatic latch mechanism 70 in the manner previously described. Such release of the latch mechanism 70 is a more positive one than is possible when the leveling devices of the present invention are not employed. In the absence of the leveling devices 12 and, unless the operator of the overhead hoist is careful accurately to center the tongs over the slab, initial engagement of the tongs with the slab may take place between the slab and one or the other of the levers 44 and 46. Since the automatic latch 70 requires only a small degree of jaw spread over and above the jaw spread which obtains when the latch mechanism is latched, contact of the slab with only one of the two levers may effect release of the latch before the tongs are squarely seated upon the slab. This will result in dropping of the pivot pin 86 and the levers carried thereby and a premature engagement of the slab with the tongs extending at an angle to the horizontal. The provision of the leveling devices remedies this limitation in that initial engagement of the foot 154 of each device with the upper face of the slab will thrust both jaws upwardly and outwardly with equally distributed force until such time as the latch mechanism becomes tripped and releases the pin 86. At the time of pin release, the tongs will assume a substantially level position.

The invention is not to be limited to the exact arrangement of parts shown in the accompanying drawings or described in this specification as various changes in the details of construction may be resorted to without departing from the spirit or scope of the invention. For example, while the invention has been illustrated and in conection with tongs of the dual jaw type, utilizing two of the leveling devices 12, the invention is applicable to tongs of the single opposed jaw type, in which case a single leveling device 12 will be employed. Furthermore, while the invention has been shown in connection with automatic gravity-operated tongs, the same is applicable, if desired, with suitable modification if necessary, to a motorized lifter mechanism utilizing any tongs principle. It is also within the purview of the present invention to omit the seating foot 154 and pivotally connect the lower ends of the two links 150 and 152 to each other. In such an instance, the connected lower ends of these links will seat upon the slab and effect the desired leveling and triggering functions previously described. Therefore, only insofar as the one invention has particularly been pointed out in the accompanying claims is the same to be limited.

Having thus described the invention what we claim as new and desire to secure by Letters Patent is:

1. In a load-lifting tongs, in combination, an elongated head beam, a lift pin positioned on and disposed medially of the ends of said head beam whereby the same may be suspended from an overhead hoist, substantailly identical link and lever assemblies carried at the opposite ends of said head beam, each link and lever assembly comprising a pair of laterally and outwardly extending links pivotally connected at their upper ends to said head beam, a pair of laterally and inwardly extending levers pivotally connected at their upper ends to the lower ends of said links, said levers crossing each other and being pivoted together for scissors-like swinging movements medially of their ends, opposed load-engaging jaws carried at the lower ends of said levers and movable toward and away from each other during swinging movements of the levers in opposite directions, a cross frame extending between and connected to said levers at their region of pivotal connection to each other and underlying said head beam, a suspension pin carried by said cross frame medially of its ends and directly underlying said lift pin, a hook plate pivoted to said head medially of its ends and underlying the lift pin, said hook plate being provided with a hook portion adapted to engage said suspension pin to retain the levers of both link and lever assemblies in elevated positions and being operable upon release of the suspension pin to allow the levers to move downwardly under the influence of gravitational force, a latch pin on said hook plate, a latch member effectively pivoted to said head and having a latch seat for receiving the latch pin therein, cooperating cam means on said suspension pin and latch member for guiding the latch pin into register with the latch seat when said levers move vertically upwardly relatively to the head, each link and lever assembly further including a pair of thrust links pivoted at their upper ends to the levers at points substantially midway between the jaws thereof and the point of pivotal connection between the levers, and a load-engaging seating foot pivotally connected at spaced points thereon to the lower ends of the thrust links and engageable with the load when the tongs are lowered in centered relationship upon the load.

2. In a load-lifting tongs, the combination set forth in claim 1 and wherein the effective pivotal connection for said latch member comprises a first link having its upper end pivoted to said head beam, a second link having its lower end pivoted to said cross frame, the lower end of the first link being pivotally connected to the upper end of the second link whereby the first and second links are movable relatively to each other in scissors-like fashion, said latch member being mounted on and movable bodily with said first link at a region adjacent to its point of pivotal connection to the head beam.

References Cited by the Examiner
UNITED STATES PATENTS 472,436  4/92  Cornelius _____ 294—110
1,516,031  11/24  Venable _____ 294—110

FOREIGN PATENTS 185,588  1922  Great Britain.

SAMUEL F. COLEMAN, Acting Primary Examiner.
ANDRES H. NEILSEN, Examiner.